United States Patent
Culbertson et al.

(10) Patent No.: US 8,158,230 B2
(45) Date of Patent: Apr. 17, 2012

(54) TAMPER EVIDENT COMPOSITE FILM

(75) Inventors: Edwin C. Culbertson, Taylors, SC (US); Kenneth J. Muschelewicz, Easley, SC (US)

(73) Assignee: Mitsubishi Polyester Film, Inc., Greenville, SC (US)

(*) Notice: Subject to any disclaimer, the term of this patent is extended or adjusted under 35 U.S.C. 154(b) by 765 days.

(21) Appl. No.: 11/935,767

(22) Filed: Nov. 6, 2007

(65) Prior Publication Data

US 2009/0117307 A1 May 7, 2009

(51) Int. Cl.
*B32B 9/00* (2006.01)
*B32B 33/00* (2006.01)
*B32B 7/12* (2006.01)
*B42D 15/00* (2006.01)

(52) U.S. Cl. ...... 428/40.1; 428/42.1; 428/354; 428/915; 428/916; 283/72; 283/82; 283/98

(58) Field of Classification Search ............... 428/40.1, 428/42.1, 343, 354, 915, 916; 283/72, 82, 283/98
See application file for complete search history.

(56) References Cited

U.S. PATENT DOCUMENTS

| | | | |
|---|---|---|---|
| 3,188,265 A | 6/1965 | Charbonneau et al. | |
| 3,983,285 A | 9/1976 | Riboulet et al. | |
| 4,082,873 A | 4/1978 | Williams | |
| 4,252,885 A | 2/1981 | McGrail et al. | |
| 4,705,707 A | 11/1987 | Winter | |
| 4,837,088 A * | 6/1989 | Freedman | 156/243 |
| 5,000,992 A | 3/1991 | Kelch | |
| 5,332,616 A | 7/1994 | Patrick et al. | |
| 5,491,022 A | 2/1996 | Smith | |
| 5,618,621 A | 4/1997 | Hasegawa et al. | |
| 5,876,816 A * | 3/1999 | Freedman | 428/40.1 |
| 5,879,028 A | 3/1999 | Benoit | |
| 6,033,758 A | 3/2000 | Kocher et al. | |
| 6,235,374 B1 | 5/2001 | Miki et al. | |
| 6,294,236 B1 | 9/2001 | Freedman | |
| 6,358,604 B1 | 3/2002 | Peiffer et al. | |
| 6,361,856 B1 | 3/2002 | Wakai et al. | |
| 6,387,386 B1 * | 5/2002 | Levy | 424/408 |
| 6,447,015 B1 | 9/2002 | Linnewiel | |
| 6,468,661 B2 | 10/2002 | Benoit et al. | |

(Continued)

FOREIGN PATENT DOCUMENTS

EP 0144878 A2 6/1985

(Continued)

OTHER PUBLICATIONS

International Search Report and Written Opinion for PCT/US2008/081713 Dated Jan. 31, 2011.

*Primary Examiner* — Patricia Nordmeyer

(74) *Attorney, Agent, or Firm* — Dority & Manning, P.A.

(57) ABSTRACT

A tamper evident composite film is disclosed. The composite film contains a first film layer made from polyester adjacent to a second film layer made from a polyolefin, such as a low density polyethylene. If desired, the composite film can further include a third film layer positioned on the opposite side of the second film layer. The composite film is produced through a coextrusion process. In one embodiment, the composite film can be biaxially stretched prior to use. The composite film is constructed so that the first film layer will delaminate from the second film layer when the composite film is tampered with or otherwise mishandled.

28 Claims, 1 Drawing Sheet

U.S. PATENT DOCUMENTS

| | | |
|---|---|---|
| 6,485,818 B2 | 11/2002 | Fujita |
| 6,537,634 B2 | 3/2003 | Otten et al. |
| 6,872,461 B2 | 3/2005 | Murschall et al. |
| 6,908,113 B2 | 6/2005 | Chaduc et al. |
| 6,921,580 B2 | 7/2005 | Akatsu et al. |
| 7,081,288 B2 | 7/2006 | Guo et al. |
| 7,151,136 B2 | 12/2006 | Montanari et al. |
| 7,238,417 B2 | 7/2007 | Kliesch et al. |
| 7,246,824 B2 | 7/2007 | Hudson |
| 2005/0258634 A1 | 11/2005 | Dronzek, Jr. |
| 2006/0275572 A1 | 12/2006 | Bonnet et al. |
| 2007/0031654 A1 | 2/2007 | Posey |
| 2007/0031656 A1 | 2/2007 | Posey |

FOREIGN PATENT DOCUMENTS

| | | |
|---|---|---|
| EP | 0296620 A2 | 6/1988 |
| WO | WO 9413476 A1 | 6/1994 |
| WO | WO 9413481 A1 | 6/1994 |

* cited by examiner

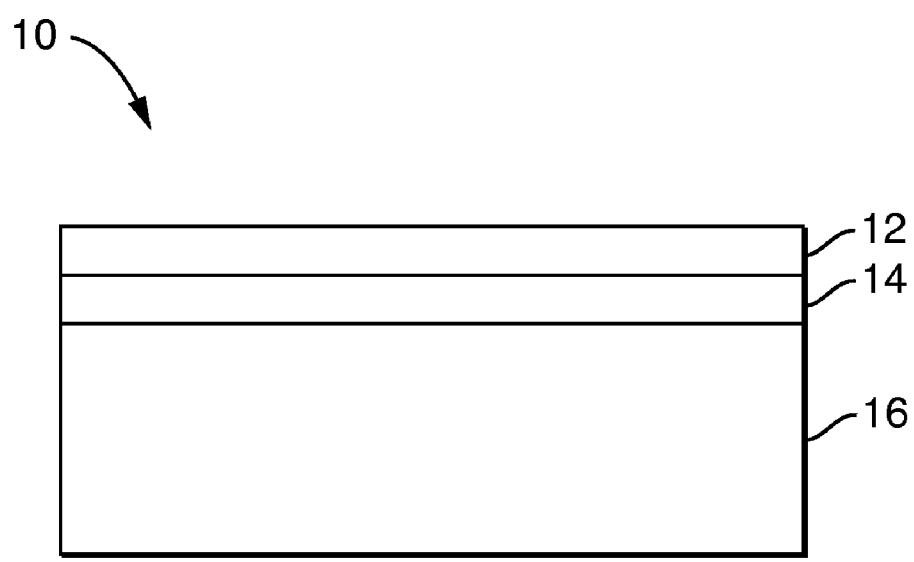

TAMPER EVIDENT COMPOSITE FILM

BACKGROUND

Security labels including tamper evident labels are needed for many diverse and numerous applications. For instance, such labels can be used to seal containers, envelopes, and other products in order to protect the items prior to use. Tamper evident labels can also prevent the labels from being transferred from an authorized product to an unauthorized product, such as a counterfeit product.

In the past, many security labels and tamper evident labels have included relatively complex constructions. For instance, security labels have been back-printed, generally after metallisation of a film to provide areas of differential adhesion of the metallisation to an adhesive layer. In these constructions, upon attempted removal of the label, the bond of the metallised layer to an adhesive layer is less than the bond of the adhesive layer to an article. In this manner, portions of the metallised layer are left on the adhesive layer when there is an attempt to remove the label. These differential tear effect areas can be used to reveal messages upon removal of the tamper evident label by leaving a variable metal pattern adhered to the adhesive on the article.

As can be appreciated, the above labels are made using many process steps, can include many different layers of materials, and are made from relatively expensive materials. Thus, a need currently exists for a tamper evident label that is relatively simple to produce and manufacture.

SUMMARY

In general, the present disclosure is directed to a tamper evident composite film. The tamper evident composite film may be used in numerous and different applications. For instance, in one embodiment, the tamper evident composite film may be used to produce a label that, once applied to an article, will delaminate easily if the label is tampered with or if one attempts to remove the label from the article.

In one embodiment, the tamper evident composite film comprises a first film layer, a second film layer, and a third film layer. The first film layer may comprise, for instance, a polyester while the second film layer may comprise a polyolefin, such as a polyethylene. The second film layer may be positioned in between and adjacent to the first film layer and the third film layer. The composite film is constructed such that the first film layer is configured to delaminate from the composite film such that the first film layer has a peel strength of less than about 50 gf/inch.

Depending upon the particular application, the peel strength between the first film layer and the second film layer can be much less than 50 gf/inch. For instance, in other embodiments, the peel strength of the first film layer to the second film layer can be less than about 25 gf/inch, such as less than about 20 gf/inch, such as less than about 15 gf/inch, such as less than about 10 gf/inch. In one particular embodiment, for instance, the peel strength between the first film layer and the second film layer can be from about 2 gf/inch to about 10 gf/inch.

Of particular advantage, the composite film of the present disclosure can be formed by coextruding the first film layer, the second film layer, and the third film layer together. After being coextruded, the resulting composite film can be stretched in at least one direction. For instance, in one embodiment, the composite film can be uniaxially stretched. Alternatively, the composite film can be biaxially stretched. For instance, the composite film can be stretched in a first direction and can be stretched in a second and opposite direction in an amount from about 1 to about 4 times its original length and/or width.

The thickness of the composite film and of the individual film layers can vary depending upon the particular application and the particular product being constructed. In one embodiment, the composite film can have a thickness of less than about 150 microns. The middle or second film layer can be relatively thin and have a thickness of less than about 10 microns. The first film layer and the third film layer, in one embodiment, can have a thickness of from about 5 microns to about 50 microns.

As described above, the first film layer generally comprises a polyester, while the second film layer comprises a polyolefin, such as a polyethylene. The second film layer, for instance, may contain a polyethylene homopolymer, such as a low density polyethylene, or a polyethylene copolymer. In addition to the polyethylene, various other additives and polymers may be present. For instance, in one embodiment, the second film layer may comprise polyethylene blended with a maleate.

The third film layer, on the other hand, may comprise any suitable thermoplastic polymer. In one particular embodiment, for instance, the third film layer may comprise a polyester. When the third film layer comprises a polyester, the composite film may be configured to delaminate not only between the first film layer and the second film layer, but also between the second film layer and the third film layer.

The composite film can include various additional film layers and coatings as desired. For instance, when constructing a label, the composite film can include an adhesive, such as a pressure sensitive adhesive applied to and located on one of the exterior surfaces. If desired, the label can include a release layer that is positioned over the pressure sensitive adhesive layer. The release layer may be removed when the label is positioned on an article.

In another embodiment, the composite film can include a print receptive coating applied to one of the exterior surfaces. Printed matter, such as designs or text, may be located on the print receptive coating.

The composite film of the present disclosure can include film layers that are translucent, transparent or opaque. In one embodiment, one or more of the film layers may contain pigment particles that add color to the film.

Other features and aspects of the present disclosure are discussed in greater detail below.

BRIEF DESCRIPTION OF THE DRAWING

A full and enabling disclosure of the present invention, including the best mode thereof to one skilled in the art, is set forth more particularly in the remainder of the specification, including reference to the accompanying figures, in which:

FIG. 1 is a cross sectional view of one embodiment of a composite film made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present invention.

The present disclosure is generally directed to a tamper evident composite film. The composite film includes multiple layers that delaminate when the composite film is used improperly. The composite film of the present disclosure can be used in numerous applications. For instance, in one embodiment, the composite film can be used to construct a tamper evident label that delaminates if one improperly attempts to remove the label from an article.

Tamper evident composite films and labels made from the composite film have various advantages and benefits. For instance, tamper evident labels are useful to indicate whether or not a product has been tampered with or otherwise improperly handled. Tamper evident labels made in accordance with the present disclosure are also very difficult if not impossible to transfer from one product to another. Thus, the labels can be used to prevent against transfer of the labels onto counterfeit products.

Tamper evident composite films made in accordance with the present disclosure can be used on various different products and in various different applications. For instance, the tamper evident composite films may be used on consumer products, security envelopes and the like, pharmaceutical containers, containers and products containing valuable goods or merchandise, inventory and other parts including automobile parts, etc.

Referring to FIG. 1, for purposes of explanation, a cross section of one embodiment of a composite film 10 made in accordance with the present disclosure is shown. The composite film 10 includes a first film layer 12, a second film layer 14, and a third film layer 16. It should be understood, however, that the composite film 10 may contain, in some embodiments, only two layers, or may contain more than three layers.

As will be described in greater detail below, the composite film 10 as shown in FIG. 1 is constructed so that the multiple film layers do not delaminate during processing and normal use. When improperly handled, however, the film layers delaminate indicating that the composite film has been tampered with or otherwise mishandled. In one embodiment, for instance, the composite film can be constructed such that the first film layer 12 delaminates from the second film layer 14. In an alternative embodiment, the composite film can be constructed so that both the first layer 12 and the third layer 16 will delaminate from the second layer 14 when improperly tampered with.

The film layers are generally made from thermoplastic polymers. In one embodiment, for instance, the first film layer 12 comprises a polyester polymer. The second film layer 14, on the other hand, may be made from a polyolefin polymer, such as polyethylene. The third film layer 16, when present, can comprise any suitable thermoplastic film. In one particular embodiment, for instance, the third film layer 16 may be made from a polyester polymer.

In order for the multilayer composite film 10 to have tamper evident properties in accordance with the present disclosure, the composite film is constructed so that the first film layer 12 and the second film layer 14 have a peel strength within desired ranges. In addition, as described above, the peel strength between the second layer 14 and the third layer 16 can be similarly controlled. In one embodiment, for instance, the peel strength between the first layer 12 and the second layer 14 may be less than about 50 gf/inch, such as from about 1 gf/inch to about 50 gf/inch. In other embodiments, the peel strength between the first film layer 12 and the second film layer 14 can be less than about 25 gf/inch, such as less than about 20 gf/inch, such as less than about 15 gf/inch, such as less than about 10 gf/inch. In one particular embodiment, for instance, the peel strength can be from about 2 gf/inch to about 10 gf/inch, such as from about 2 gf/inch to about 7 gf/inch.

Of particular advantage, the composite film 10 can be made according to a coextrusion process. In other words, the composite film 10 containing the different film layers can be made in a single process sequence. For instance, the different polymers used to form the different film layers may be melted and extruded together to form the composite film.

As described above, the first film layer 12 generally comprises a polyester polymer. The polyester may comprise, for instance, polyethylene terephthalate, polyethylene naphthalate or polybutylene terephthalate. Copolyester polymers may also be used such as polyethylene terephthalate isophthalate. Generally, any polyester film based on a polymer resulting from polycondensation of a glycol or diol with a dicarboxylic acid (or its ester equivalents) such as terephthalic acid, isophthalic acid, sebacic acid, malonic acid, adipic acid, azelaic acid, glutaric acid, suberic acid, succinic acid, and the like, or mixtures of two or more of the foregoing may be used. Suitable glycols include ethylene glycol, diethylene glycol, polyethylene glycol, and polyols such as butanediol and the like. Mixtures of two or more of the foregoing are also suitable.

The second film layer 14, as described above, can be made from a polyolefin polymer, such as polyethylene or polypropylene. In one embodiment, for instance, the second film layer 14 can be made from a polyethylene homopolymer or a polyethylene copolymer. The polyethylene copolymer, for instance, may comprise a random copolymer or a block copolymer.

In one particular embodiment, the second film layer can contain a low density polyethylene. The low density polyethylene, for instance, can have a density of less than about 1.0 g/ml.

In addition to a polyethylene polymer, the second film layer 14 may contain various other additives. In one embodiment, the second film layer 14 may comprise a polyethylene polymer combined with one or more other polymers. In general, however, the second film layer 14 should be made primarily from the polyolefin polymer. For instance, the polyolefin polymer may be present in the second film layer in an amount greater than 50% by weight, such as in an amount greater than about 70% by weight, such as in an amount greater than about 90% by weight.

In one embodiment, the second film layer 14 may comprise a polyethylene polymer blended with a maleate. The maleate may comprise, for instance, a polyolefin functionalized with maleic anhydride. For instance, in one embodiment, the maleate may comprise a copolymer of ethylene with an unsaturated carboxylic anhydride, such as maleic anhydride, and optionally with a $C_1$-$C_8$ alkyl(meth)acrylate or a vinyl ester of a saturated carboxylic acid. The content by weight of carboxylic acid anhydride, especially maleic anhydride, is between 0.1 and 50%, such as between 0.1 and 40%, such as between 1 and 35%, and, in one embodiment, between 1 and 10%. Such polymers are commercially available under the name LOTADER from Arkema, Inc. of Philadelphia, Pa. Particular examples of such polymers include:

Lotader® 4700: ethylene/ethyl acrylate/maleic anhydride statistical copolymer with proportions by weight of 68.5/30/1.5, with an MFI value of between 3 and 10 g/10 min (at 190° C. under 2.16 kg), obtained by high pressure radical catalysis. It has on average 2 to 3 anhydride functional groups per macromolecule.

Lotader®4720: ethylene/ethyl acrylate/maleic anhydride statistical copolymer with proportions by weight of 69.7/30/

0.3, with an MFI value of between 3 and 10 g/10 min (at 190° C. under 2.16 kg), obtained by high pressure radical catalysis. It has on average 0.4 to 1.2 anhydride functional groups per macromolecule.

Lotader® 3410: ethylene/butyl acrylate/maleic anhydride statistical copolymer with proportions by weight of 78/18/3, with an MFI value of between 3 and 10 g/10 min (at 190° C. under 2.16 kg), obtained by high pressure radical catalysis. It has on average 3 to more than 3 anhydride functional groups per macromolecule.

The third film layer 16 as shown in FIG. 1 can be made from any suitable thermoplastic polymer. The third film layer 16, for instance, may be made from polyamides exemplified by nylon, polyolefins such as polypropylene and polyethylene, polycarbonate, and the like. In one embodiment, for instance, the third film layer 16 may be made from a polyester polymer as described above. When made from a polyester polymer, the third film layer 16 may delaminate from the second film layer 14 similar to the manner in which the first film layer 12 delaminates from the second film layer 14.

In order to form the composite film of the present disclosure, in one embodiment, the film layers can be coextruded together. For example, each of the polymers or polymer blends used to form the layers can be melted separately and then extruded together as a single, but layered, sheet onto a polished revolving casting drum to form a cast multilayer film. The composite film is quickly cooled and then stretch oriented in one or more directions to impart strength and toughness to the composite film. The composite film, for instance, can be uniaxially stretched or biaxially stretched. Generally, stretching occurs in a temperature range from about the second order transition temperature of the polyester polymer to below the temperature at which the polymer softens and melts. Where necessary, the composite film can also be heat treated after stretching to "lock-in" the properties of the polyester film layer by further crystallizing the film. The crystallization imparts stability and good tensile properties to the composite film. Such heat treatment for a polyester film layer is generally conducted at a temperature of from about 190° C. to about 240° C. For instance, in one embodiment, the composite film can be exposed to heat of from about 215° C. to about 225° C. for a period of about 1 second to about 20 seconds, such as from about 2 seconds to about 10 seconds.

The amount the film is stretched prior to being heat treated can depend upon various factors. When uniaxially stretched, the film can be stretched in one direction (such as the machine direction or the cross machine direction) in an amount from about 1 times to about 4 times its original length, such as from about 3 times to about 4 times its original length. When biaxially stretched, the film can then be stretched in a perpendicular direction in an amount from about 1 times to about 4 times its original length, such as from about 3 times to about 4 times its original length.

Unexpectedly, the present inventors have discovered that the middle layer containing, for instance, a polyethylene polymer, can be biaxially stretched with the other layers without the composite film delaminating during processing. Thus, when the film layers are coextruded together, the different polymer layers are sufficiently compatible with each other and have sufficient attraction with each other to withstand a biaxial stretching process.

The final thickness of the composite film can vary depending upon the type of polymers used to form the film layers, the process used to form the film, and the end use application. In general, the composite film can have a thickness of from about 10 microns to about 500 microns or greater. In one embodiment, for instance, the composite film can have a thickness of less than about 150 microns.

For instance, when the first film layer comprises a polyester polymer, the first film layer can have a thickness of from about 5 microns to about 50 microns. When the second film layer comprises a polyolefin, such as polyethylene, the second film layer can have a thickness of from about 1 micron to about 10 microns. The thickness of the third layer can vary from about 1 micron to about 100 microns or greater. When the third film layer comprises a polyester, for instance, the third film layer can have a thickness of from about 5 microns to about 50 microns.

After being formed, the composite film can be translucent, transparent, or opaque. For example, in one embodiment, each of the film layers can be made from thermoplastic polymers such that each film layer is transparent. In other embodiments, however, it may be desirable so that one or more of the film layers is translucent or opaque.

In this regard, any of the film layers, and particularly the first film layer and the third film layer can contain one or more pigments for providing color. The pigments may comprise, for instance, titanium dioxide particles, metal oxide particles, carbon particles, and the like. In general, any suitable pigment particle may be incorporated into the film in order to provide the film layer with the proper color. One or more of the film layers, for instance, can be white, black, gray, or any other suitable color.

In addition to pigments, the polymer film layers can also contain any suitable conventional additives. Such additives may include, for instance, antioxidants, delusterants, fillers, antistatic agents, and the like.

In addition to the three film layers as shown in FIG. 1, the composite film may include various other film layers and coatings.

For example, when the composite film 10 is used as a label, an adhesive layer may be applied to one of the exterior surfaces of the composite film. For example, in one embodiment, an adhesive layer may be applied to an exterior surface adjacent to the third film layer 16. The adhesive that is applied to the composite film can depend upon the particular application for the label. In one embodiment, for instance, the adhesive may comprise a pressure sensitive adhesive.

When an adhesive layer is applied to the composite film, a release layer may be used to cover the adhesive layer prior to use. In this regard, a release layer comprising a paper or film having a low adhesion surface may be placed over the adhesive layer and configured to be removed prior to use. In one embodiment, for instance, the release layer may comprise a sheet-like substrate having a silicone coating applied to one surface.

In one embodiment, the composite film may be formed into a wound tape material. In this embodiment, an adhesive layer may be applied to one of the exterior surfaces. The opposite exterior surface, on the other hand, may include a release coating that allows the composite film to unwind during use.

In addition to adhesive layers, in other embodiments, various different coatings may be applied to the composite film so that the film will readily accept printed matter.

Thus, one or both surfaces of the composite film may therefore have a print-receptive coating. The coating can be applied inline or offline. When applied inline, for instance, the coating can be applied prior to transverse orientation or stretching. The coating can be applied using any suitable method, such as a reverse gravure roll coating process.

The coatings can be applied in one embodiment as an aqueous system, such as a solution, a suspension, or as a dispersion. In addition to making the film more printable, one or more coating materials may be used to make the composite film sealable, metallizable, sterilizable, anti-static, or even improving the composite film's aroma barrier.

Examples of substances that may be used to form the coatings can include acrylates, as described by way of example in WO 94/13476, ethylene-vinyl alcohols, PVDC, waterglass ($Na_2SiO_4$), hydrophilic polyesters (PET/IPA polyesters containing the sodium salt of 5-sulfoisophthalic acid), for example as described in EP-A-0 144 878 or U.S. Pat. No. 4,252,885 or EP-A-0 296 620, vinyl acetates, for example as described in WO 94/13481, polyvinyl acetates, polyurethanes, the alkali metal or alkaline earth metal salts of $C_{10}$-$C_{18}$ fatty acids, and butadiene copolymers with acrylonitrile or methyl methacrylate, methacrylic acid, acrylic acid, or esters thereof.

The compositions or substances mentioned are applied in the form of dilute, preferably aqueous, solution, emulsion, or dispersion to one or both surfaces of the film. The solvent is then evaporated. If the coatings are applied in-line prior to transverse stretching, the heat treatment during transverse stretching and subsequent heat-setting is usually sufficient to evaporate the solvent and dry the coating. The dried coatings then have the abovementioned desired layer thicknesses.

The films may also be coated—preferably in an off-line process—with metals, such as aluminum, or with ceramic materials, such as $SiO_x$ or $Al_xO_y$. This in particular improves their gas-barrier properties.

The thickness of the coatings can vary depending upon the particular application. The thickness of the coatings, for instance, may be from about 5 nm to about 100 nm, such as from about 20 nm to about 70 nm.

The present disclosure may be better understood with reference to the following example.

EXAMPLE

The following example demonstrates some of the benefits and advantages of the present disclosure.

In this example, composite films were made in accordance with the present disclosure. More particularly, five different samples were produced. Each sample contained three film layers. In all of the samples, both of the outside film layers were made from a polyester polymer, namely polyethylene terephthlate. The composition of the middle layer, however, changed from sample to sample as follows:

Sample No. 1

Middle layer contained 100% by weight low density polyethylene.

Sample No. 2

Middle layer contained 90% by weight low density polyethylene and 10% by weight of a maleate. The maleate used was LOTADER 4503 obtained from Arkema, Inc.

Sample No. 3

Middle layer contained 80% by weight low density polyethylene and 20% by weight of a maleate. The maleate used was LOTADER 4503 obtained from Arkema, Inc.

Sample No. 4

Middle layer contained 90% by weight low density polyethylene and 10% by weight of a maleate. The maleate used was LOTADER 3210 obtained from Arkema, Inc.

Sample No. 5

Middle layer contained 80% by weight low density polyethylene and 20% by weight of a maleate. The maleate used was LOTADER 3210 obtained from Arkema, Inc.

In the samples above, the low density polyethylene was obtained from Nova Chemicals.

For each of the samples, the first film layer had a thickness of 3.5 microns, the second or middle film layer had a thickness of 3.5 microns, and the third film layer had a thickness of 41.5 microns.

The above composite film samples were produced in a coextrusion process. Thus, no further materials were contained in between the film layers. For instance, the composite film did not include any tie layers or adhesive layers in between the above described film layers. During the coextrusion process, the resulting composite film was biaxially stretched approximately 3.2 times its original length in both the machine direction and the cross machine direction.

After being formed, the above composite film samples were then subjected to a peel test. Specifically, the peel strength was measured in between the first film layer and the second film layer. The peel test was conducted using an Instron tensile testing device. Five specimens from each composite film sample were tested and the results were averaged. The specimens that were tested were cut to have dimensions of 12 inches×1 inch.

To test the samples, the first film layer was slightly delaminated from the composite film. The delaminated portions were then put into opposing jaw grips of the tensile testing machine. The tensile testing machine then measured the amount of force necessary to completely delaminate the first film layer from the remainder of the composite film. The following results were obtained:

| Sample # | Avg. Peel Strength (gf/inch) | Maximum Peel Strength (gf/inch) |
|---|---|---|
| 1 | 3.1 | 3.6 |
| 2 | 4.3 | 4.8 |
| 3 | 7.4 | 9.6 |
| 4 | 7.2 | 8.1 |
| 5 | 36.7 | 44.5 |

As shown above, the amount of peel strength necessary to delaminate the first film layer from the composite film can vary depending upon the composition of the second film layer.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A tamper evident composite film comprising:
   a first film layer comprising a polyester;
   a second film layer comprising a polyolefin and a maleate, the second film layer being positioned adjacent to the first film layer;
   a third film layer being positioned adjacent to the second film layer such that the second film layer is located in between the first film layer and the third film layer;
   wherein the composite film has a first exterior surface and a second and opposite exterior surface and wherein a pressure sensitive adhesive is located on the first exterior surface, the tamper evident composite film further comprising a release layer positioned over the pressure sensitive adhesive; and
   wherein the first film layer is configured to delaminate from the second film layer such that the first film layer has a peel strength of less than about 50 gf/inch.

2. A tamper evident composite film as defined in claim 1, wherein the third film layer comprises a polyester.

3. A tamper evident composite film as defined in claim 1, wherein the polyolefin contained in the second film layer comprises a polyethylene homopolymer.

4. A tamper evident composite film as defined in claim 1, wherein the second film layer comprises a polyethylene combined with a maleate.

5. A tamper evident composite film as defined in claim 1, wherein the first film layer has a peel strength of less than about 25 gf/inch.

6. A tamper evident composite film as defined in claim 1, wherein the composite film is formed by coextruding the first film layer, the second film layer, and the third film layer together.

7. A tamper evident composite film as defined in claim 1, wherein the second film layer has a thickness of less than about 10 microns.

8. A tamper evident composite film as defined in claim 1, wherein the composite film has a thickness of less than about 150 microns.

9. A tamper evident composite film as defined in claim 1, wherein a print receptive coating is located on the first exterior surface.

10. A tamper evident composite film as defined in claim 9, wherein printed matter is located on the print receptive coating.

11. A tamper evident composite film as defined in claim 1, wherein the composite film has been at least uniaxially stretched.

12. A tamper evident composite film as defined in claim 1, wherein the composite film has been biaxially stretched.

13. A tamper evident composite film as defined in claim 12, wherein the composite film has been stretched in a first direction and has been stretched in a second direction, the second direction being substantially transverse to the first direction, the composite film having been stretched from about 1 to about 4 times in both the first direction and the second direction.

14. A tamper evident composite film as defined in claim 1, wherein the first film layer and the third film layer have a thickness of from about 5 microns to about 50 microns and wherein the second film layer has a thickness of from about 1 micron to about 10 microns.

15. A tamper evident composite film as defined in claim 1, wherein at least the first film layer or the third film layer contains pigment particles.

16. A label incorporating the composite film defined in claim 1.

17. A tamper evident composite film as defined in claim 1, wherein the second film layer comprises the polyolefin functionalized with maleic anhydride.

18. A tamper evident composite film as defined in claim 1, wherein the maleate comprises a copolymer of ethylene and maleic anhydride.

19. A tamper evident composite film as defined in claim 18, wherein the maleic anhydride is present in the copolymer in an amount from about 1% to about 35% by weight.

20. A tamper evident composite film comprising:
   a first film layer comprising a polyester;
   a second film layer comprising a polyethylene combined with a maleate, the second film layer being positioned adjacent to the first film layer;
   a third film layer being positioned adjacent to the second film layer such that the second film layer is located in between the first film layer and the third film layer; and
   wherein the first film layer is configured to delaminate from the second film layer such that the first film layer has a peel strength of less than about 50 gf/inch.

21. A tamper evident composite film as defined in claim 20, wherein the third film layer comprises a polyester.

22. A tamper evident composite film as defined in claim 20, wherein the composite film is formed by coextruding the first film layer, the second film layer, and the third film layer together.

23. A tamper evident composite film as defined in claim 22, wherein the composite film has been biaxially stretched.

24. A tamper evident composite film as defined in claim 20, wherein the composite film has a first exterior surface and a second and opposite exterior surface, and wherein a pressure sensitive adhesive is located on the first exterior surface.

25. A tamper evident composite film as defined in claim 24, wherein a release layer is positioned over the pressure sensitive adhesive layer.

26. A tamper evident composite film as defined in claim 20, wherein the second film layer comprises a copolymer of ethylene and maleic anhydride.

27. A tamper evident composite film as defined in claim 19, wherein the maleate comprises an ethylene/ethyl acrylate/maleic anhydride copolymer or an ethylene/butyl acrylate/maleic anhydride copolymer.

28. A tamper evident composite film comprising:
   a first film layer comprising a polyester;
   a second film layer comprising a low density polyethylene, the second film layer being positioned adjacent to the first film layer;
   a third film layer being positioned adjacent to the second film layer such that the second film layer is located in between the first film layer and the third film layer;
   wherein the composite film has a first exterior surface and a second and opposite exterior surface and wherein a pressure sensitive adhesive is located on the first exterior surface, the tamper evident composite film further comprising a release layer positioned over the pressure sensitive adhesive; and
   wherein the first film layer is configured to delaminate from the composite film such that the first film layer has a peel strength of less than about 50 gf/inch and wherein the composite film is formed by coextruding the first film layer, the second film layer, and the third film layer together and wherein the composite film has been stretched in a first direction and has been stretched in a second direction, the second direction being substantially transverse to the first direction, the composite film having been stretched from about 1 to about 4 times in both the first direction and the second direction.

* * * * *